(12) United States Patent
Kunomura et al.

(10) Patent No.: US 11,381,192 B2
(45) Date of Patent: Jul. 5, 2022

(54) POWER CONVERSION CONTROLLER

(71) Applicant: CENTRAL JAPAN RAILWAY COMPANY, Aichi (JP)

(72) Inventors: Ken Kunomura, Aichi (JP); Toshimasa Shimizu, Aichi (JP); Kenji Sato, Aichi (JP); Toshiaki Takami, Aichi (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 139 days.

(21) Appl. No.: 17/085,273

(22) Filed: Oct. 30, 2020

(65) Prior Publication Data
US 2021/0367544 A1 Nov. 25, 2021

(30) Foreign Application Priority Data

May 22, 2020 (JP) .............................. JP2020-089878

(51) Int. Cl.
| | |
|---|---|
| *H02P 27/08* | (2006.01) |
| *H02M 7/44* | (2006.01) |
| *H02M 7/797* | (2006.01) |
| *B60L 15/00* | (2006.01) |
| *B60L 9/24* | (2006.01) |

(52) U.S. Cl.
CPC ................ *H02P 27/08* (2013.01); *B60L 9/24* (2013.01); *B60L 15/007* (2013.01); *H02M 7/44* (2013.01); *H02M 7/797* (2013.01); *B60L 2200/26* (2013.01)

(58) Field of Classification Search
CPC .......... H02P 27/08; B60L 9/24; B60L 15/007; B60L 2200/26; H02M 7/44

USPC ......................................................... 318/767
See application file for complete search history.

(56) References Cited

U.S. PATENT DOCUMENTS

2019/0135117 A1* 5/2019 Kunomura ............ B60L 15/007
2020/0238835 A1* 7/2020 Kunomura ............... H02M 7/48

FOREIGN PATENT DOCUMENTS

| CN | 106953365 A | * | 7/2017 | |
|---|---|---|---|---|
| JP | 4568111 B2 | | 10/2010 | |
| JP | 2017118782 A | * | 6/2017 | |
| JP | 2017188990 A | * | 10/2017 | ............ B60L 15/007 |
| JP | 2017188990 A | | 10/2017 | |

* cited by examiner

*Primary Examiner* — Jorge L Carrasquillo
(74) *Attorney, Agent, or Firm* — David D. Brush; Westman, Champlin & Koehler, P.A.

(57) ABSTRACT

Provided is a power conversion controller in which variation in reactive power among power conversion controllers can be inhibited while maintaining the running performance of vehicles. The power conversion controller includes a power factor setter that sets a power factor based on a detection value of an overhead line voltage, and a calculator that calculates a reactive current command value by multiplying an active current command value by a tangent of a power factor angle of the power factor. The power factor setter sets a reference value set in advance as the power factor if the detection value is within a reference range, sets a value smaller than the reference value as the power factor if the detection value is below the reference range, and sets a value larger than the reference value as the power factor if the detection value is beyond the reference range.

4 Claims, 4 Drawing Sheets

POWER CONVERSION CONTROLLER

CROSS-REFERENCE TO RELATED APPLICATIONS

This application claims the benefit of Japanese Patent Application No. 2020-089878 filed on May 22, 2020 with the Japan Patent Office, the entire disclosure of which is incorporated herein by reference.

BACKGROUND

The present disclosure relates to a power conversion controller.

In a train running by collecting AC current from an overhead line, an AC power is converted by a power converter to be supplied to a main electric motor. In a railroad feeding circuit including the overhead line, a voltage drops according to power consumption by vehicles constituting the train. Such voltage drop causes further increase in current consumption by the vehicles, thus further accelerating the voltage drop. This may result in insufficient propulsive force of the vehicles.

To cope with this, a first method has been devised in which a reactive current is consumed in the power converter in order to compensate the voltage drop in the feeding circuit (see Japanese Unexamined Patent Application Publication No. 2017-188990). In the first method, a reactive current command value adjusted by an AC voltage control of a power conversion controller is inputted to the power converter.

Further, a second method is also known in which a power factor is fixed and reactive power is determined according to active power (see Japanese Patent No. 4568111). In the second method, a voltage between connection points of the power converter is inputted to the power conversion controller, and the active power and the reactive power are determined.

SUMMARY

In the above-described first method, the AC voltage control is performed using a tertiary voltage in a main transformer in each vehicle as an overhead line voltage. Thus, if obtained values of the tertiary voltage vary among the vehicles, it is feared that the reactive power in each vehicle may become imbalanced.

Further, in the above-described second method, an active current command value is determined based on a phase-advanced reactive current command value outputted by the power conversion controller, and thus, setting of the active power is restricted. This may result in creating problems in the running performance of the vehicles.

It is desirable that one aspect of the present disclosure provide a power conversion controller in which variation in reactive power among power conversion controllers can be inhibited while maintaining the running performance of vehicles.

One aspect of the present disclosure is a power conversion controller that controls a power converter configured to convert an AC power inputted from an overhead line and to consume an active power and a reactive power. The power conversion controller comprises: a power factor setter configured to set a power factor based on a detection value of an overhead line voltage; and a calculator configured to calculate a reactive current command value for causing the power converter to consume the reactive power by multiplying an active current command value for causing the power converter to consume the active power by a tangent of a power factor angle of the power factor.

The power factor setter is configured: if the detection value is within a reference range set in advance, to set a reference value set in advance as the power factor; if the detection value is below the reference range, to set a value smaller than the reference value as the power factor; and if the detection value is beyond the reference range, to set a value larger than the reference value as the power factor.

Such a configuration imposes no restriction on setting of the active power, and thus, the running performance of vehicles is maintained. In addition, since the reactive current command value is calculated using the power factor set according to the range of the detection value of the overhead line voltage, variation in the reactive power among the power converters is inhibited.

Furthermore, since the power factor is set smaller when the detection value is below the reference range and the power factor is set larger when the detection value is beyond the reference range, the voltage of a feeding circuit during high load at a feeding substation can be stabilized, and also overvoltage of the feeding circuit during low load at the feeding substation can be inhibited.

One aspect of the present disclosure may further comprise an adjuster including a lag element configured to delay the reactive current command value calculated by the calculator. Such a configuration makes it possible to facilitate stabilization of the voltage of the feeding circuit.

One aspect of the present disclosure may further comprise: a maximum value setter configured to set a first maximum value according to a magnitude of the active current command value; and a restrictor configured to have the reactive current command value inputted thereto and to output, as a new reactive current command value, a smallest value among the reactive current command value inputted thereto, the first maximum value, and a second maximum value set in advance. Such a configuration make it possible to prioritize consumption of the active power in the power converter. Thus, running of the vehicles can be stabilized.

In one aspect of the present disclosure, the power factor setter may comprise: a preprocessor configured to calculate a voltage difference by subtracting the detection value from a voltage command value obtained by a first-order lag control of the detection value; and a postprocessor configured: if the voltage difference is zero, to set the reference value as the power factor; if the voltage difference is positive, to set, as the power factor, a value obtained by subtracting a first adjustment value proportional to an absolute value of the voltage difference from the reference value; and if the voltage difference is negative, to set, as the power factor, a value obtained by adding a second adjustment value proportional to an absolute value of the voltage difference to the reference value. Such a configuration enables accurate setting of the power factor corresponding to the detection value of the overhead line voltage.

In one aspect of the present disclosure, the preprocessor may be configured: if the voltage command value is larger than a maximum command value set in advance, to calculate the voltage difference using the maximum command value as the voltage command value; and if the voltage command value is smaller than a minimum command value set in advance, to calculate the voltage difference using the minimum command value as the voltage command value. The postprocessor may be configured: if the voltage difference is positive, to set, as the first adjustment value, a value obtained by multiplying a smaller one of the voltage difference and a maximum voltage difference set in advance by a first coefficient; and if the voltage difference is negative, to set, as the second adjustment value, a value obtained by multiplying a larger one of the voltage difference and a minimum voltage difference set in advance by a second coefficient. Such a configuration inhibits the power factor from being too large or too small, and thus, stabilization of the voltage of the feeding circuit can be facilitated.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

1. First Embodiment 1-1. Configuration

Figure 1:
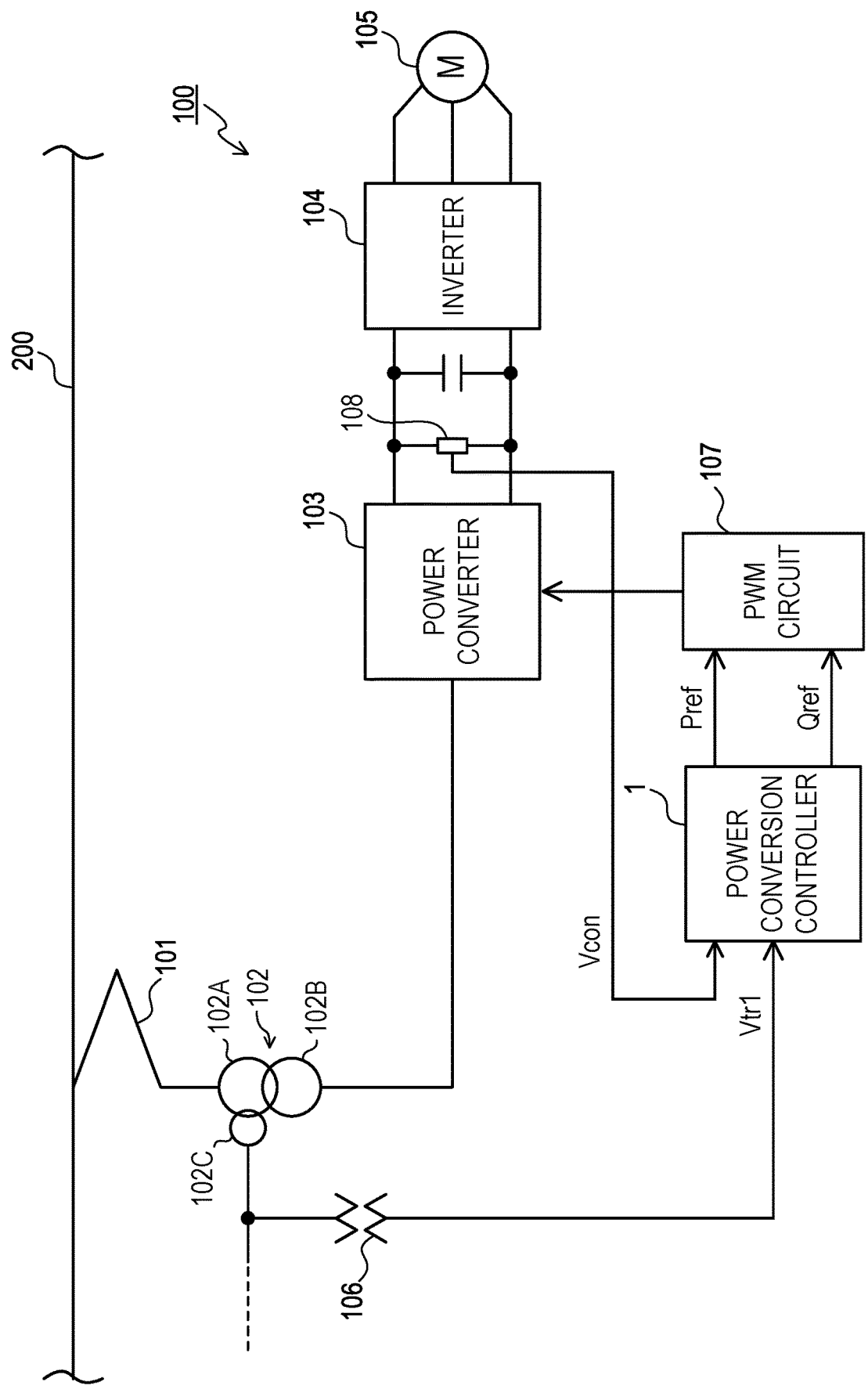
FIG. 1 is a schematic diagram showing a configuration of a main circuit system in the embodiment.

A main circuit system 100 shown in FIG. 1 is provided in each of vehicles constituting a train. However, it is not necessary for the main circuit system 100 to be provided in every vehicle constituting the train.

The main circuit system 100 comprises a pantograph 101, a main transformer 102, a power converter 103, an inverter 104, a main electric motor 105, an overhead line voltage detector 106, a PWM (Pulse Width Modulation) circuit 107, and a power conversion controller 1.

<Pantograph>

The pantograph 101 is a known device to collect AC power from an overhead line 200. The pantograph 101 slides along the overhead line 200.

<Main Transformer>

The main transformer 102 is configured to reduce the voltage of the AC power collected by the pantograph 101 and to supply it to the power converter 103.

The main transformer 102 comprises a primary winding 102A, a secondary winding 102B, and a tertiary winding 102C. The AC power is inputted to the primary winding 102A from the pantograph 101. The secondary winding 102B outputs a secondary output power obtained by reducing the voltage of the AC power to the power converter 103. The tertiary winding 102C supplies a tertiary output power obtained by reducing the voltage of the AC power to an auxiliary circuit system (not shown).

<Power Converter>

The power converter 103 is configured to convert the secondary output power into DC power. The power converter 103 of the present embodiment is a so-called PWM (Pulse Width Modulation) converter.

The power converter 103 is configured to consume active power and reactive power based on an active current command value and a reactive current command value outputted by the power conversion controller 1 to be described later.

<Inverter>

The inverter 104 is configured to convert the DC power outputted from the power converter 103 into a three-phase AC power and to output the three-phase AC power to the main electric motor 105. The inverter 104 of the present embodiment is so-called a VVVF (Variable Voltage Variable Frequency) inverter or a VFD (Variable-Frequency Drive) inverter.

<Main Electric Motor>

The main electric motor 105 is a travelling power source for the vehicles, and causes wheels of the vehicles to rotate. The main electric motor 105 of the present embodiment is a three-phase induction motor.

<Overhead Line Voltage Detector>

The overhead line voltage detector 106 is configured to detect the magnitude of a voltage inputted from the overhead line 200 to the pantograph 101.

Specifically, the overhead line voltage detector 106 detects the tertiary output power outputted from the tertiary winding 102C of the main transformer 102 as an overhead line voltage detection value Vtr1 [pu], and outputs the overhead line voltage detection value Vtr1 to the power conversion controller 1.

The overhead line voltage detection value Vtr1 is an estimated value of a primary voltage (i.e., an overhead line voltage) in the main transformer 102, and is not necessarily identical to the true value of the overhead line voltage. The overhead line voltage detection value Vtr1 may be converted into a value in a per-unit system in the overhead line voltage detector 106, or may be converted into a value in a per-unit system in the power conversion controller 1.

<PWM Circuit>

The PWM circuit 107 controls the power converter 103 based on an active current command value Pref [pu] and a reactive current command value Qref [pu] inputted from the power conversion controller 1.

Specifically, the PWM circuit 107 controls switching elements of the power converter 103 to thereby cause the power converter 103 to consume an active current corresponding to the active current command value Pref and a phase-advanced reactive current corresponding to the reactive current command value Qref.

The active current command value Pref is a value obtained by standardizing the active current corresponding to the active power, based on a rated input current value of the power converter 103. The active current command value Pref is a command value for causing the power converter 103 to consume an intended active power (i.e., for inputting the intended active power to the power converter 103). The active power is an electric power required for running the vehicles. That is, the active power is an electric power that should be supplied to loads including the inverter 104 and the main electric motor 105.

The reactive current command value Qref is a value obtained by standardizing the reactive current corresponding to the reactive power, based on the rated input current value of the power converter 103. The reactive current command value Qref is a command value for causing the power converter 103 to consume an intended reactive power (i.e., for inputting an intended phase-advanced reactive power to the power converter 103).

<Power Conversion Controller>

Figure 2:
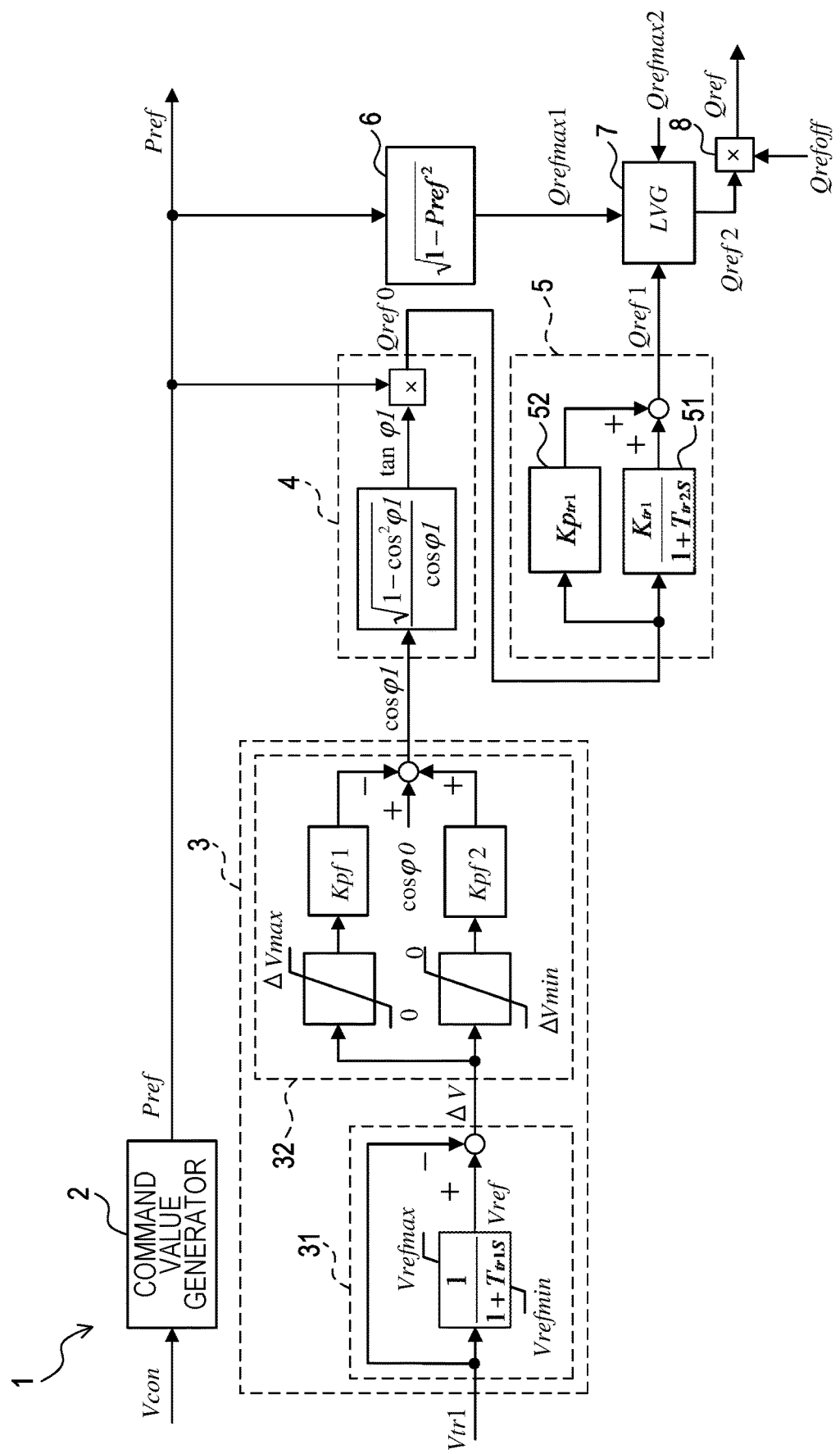
FIG. 2 is a block diagram schematically showing a configuration of a power conversion controller in the main circuit system in FIG. 1.

The power conversion controller 1 controls the power converter 103. As shown in FIG. 2, the power conversion controller 1 comprises a command value generator 2, a power factor setter 3, a calculator 4, an adjuster 5, a maximum value setter 6, a restrictor 7, and a reactive processor 8.

The power conversion controller 1 may be configured with a computer that performs functions of the respective parts by a control program, or may be configured with a combination of a computer and a logic circuit or an analog circuit. That is, the command value generator 2, the power factor setter 3, the calculator 4, the adjuster 5, the maximum value setter 6, the restrictor 7, and the reactive processor 8 are each any of the computer, the logic circuit, and the analog circuit.

[Command Value Generator]

The command value generator 2 is configured to generate the active current command value Pref determined according to the active power.

The command value generator 2 generates the active current command value Pref based on an output voltage detection value Vcon [pu] of the power converter 103 detected by a converter voltage detector 108 (see FIG. 1) arranged between the power converter 103 and the inverter 104.

Specifically, in order for an output voltage of the power converter 103 to be maintained to a rated value, the command value generator 2 makes the active current command value Pref to be generated larger, as the output voltage detection value Vcon gets smaller.

Alternatively, the command value generator 2 may generate the active current command value Pref according to a state of a notch that designates a running speed of the train in stages. For example, the command value generator 2 may make the active current command value Pref to be generated larger according to progression of the notch.

[Power Factor Setter]

The power factor setter 3 is configured to set a power factor cos φ1 based on the overhead line voltage detection value Vtr1. The power factor setter 3 comprises a preprocessor 31 and a postprocessor 32.

The preprocessor 31 is configured to calculate a voltage difference ΔV [pu] by subtracting the overhead line voltage detection value Vtr1 from a voltage command value Vref [pu] obtained by a first-order lag control of the overhead line voltage detection value Vtr1 and to output the voltage difference ΔV to the postprocessor 32.

Specifically, the preprocessor 31 firstly processes the overhead line voltage detection value Vtr1 with a first-order lag filter (i.e., a first-order lag element) with a time constant Ttr1 and a gain of 1, and sets a value obtained by limiting the processed value with a maximum command value Vrefmax [pu] and a minimum command value Vrefmin [pu] as the voltage command value Vref. Next, the preprocessor 31 calculates the voltage difference ΔV by subtracting the overhead line voltage detection value Vtr1 from the voltage command value Vref.

In other words, if the voltage command value Vref obtained by the first-order lag control is larger than the maximum command value Vrefmax set in advance, the preprocessor 31 calculates the voltage difference ΔV using the maximum command value Vrefmax as the voltage command value Vref. On the other hand, if the voltage command value Vref obtained by the first-order lag control is smaller than the minimum command value Vrefmin set in advance, the preprocessor 31 calculates the voltage difference ΔV using the minimum command value Vrefmin as the voltage command value Vref.

The postprocessor 32 is configured to output the power factor cos φ1 based on the voltage difference ΔV calculated by the preprocessor 31.

If the voltage difference ΔV is zero, the postprocessor 32 sets a reference value cos φ0 set in advance as the power factor cos φ1. If the voltage difference ΔV is positive, the postprocessor 32 sets, as the power factor cos φ1, a value obtained by subtracting a first adjustment value proportional to the absolute value of the voltage difference ΔV from the reference value cos φ0. If the voltage difference ΔV is negative, the postprocessor 32 sets, as the power factor cos φ1, a value obtained by adding a second adjustment value proportional to the absolute value of the voltage difference ΔV to the reference value cos φ0 (i.e., the power factor cos φ1 is brought closer to 1).

Specifically, if the voltage difference ΔV is positive, the postprocessor 32 sets, as the first adjustment value, a value obtained by multiplying a smaller one of the voltage difference ΔV and a maximum voltage difference ΔVmax [pu] set in advance by a first coefficient Kpf1 (i.e., a value obtained by being subjected to a proportional processing).

Further, if the voltage difference ΔV is negative, the postprocessor 32 sets, as the second adjustment value, a value obtained by multiplying a larger one of the voltage difference ΔV and a minimum voltage difference ΔVmin [pu] set in advance by a second coefficient Kpf2 (i.e., a value obtained by being subjected to a proportional processing). The first coefficient Kpf1 and the second coefficient Kpf2 are each a gain for adjusting the power factor.

As described above, the power factor setter 3 is configured: to set the reference value cos φ0 set in advance as the power factor cos φ1 if the overhead line voltage detection value Vtr1 falls within a reference range set in advance; to set a value smaller than the reference value cos φ0 as the power factor cos φ1 if the overhead line voltage detection value Vtr1 is below the reference range; and to set a value larger than the reference value cos φ0 as the power factor cos φ1 if the overhead line voltage detection value Vtr1 is beyond the reference range.

[Calculator]

The calculator 4 is configured to calculate an initial reactive current command value Qref0 [pu] by multiplying the active current command value Pref generated by the command value generator 2 by a tangent tan φ1 of a power factor angle φ1 of the power factor cos φ1.

The initial reactive current command value Qref0 is eventually converted into the reactive current command value Qref and the reactive current command value Qref is outputted to the PWM circuit 107. That is, the initial reactive current command value Qref0 is a form of the reactive current command value Qref.

[Adjuster]

The adjuster 5 comprises a lag element 51 and a proportional element 52. The lag element 51 is configured to delay a response of the initial reactive current command value Qref0 calculated by the calculator 4. The lag element 51 is a first-order lag filter with a time constant Ttr2 and a lag gain Ktr1.

The proportional element 52 is configured to multiply the initial reactive current command value Qref0 by a proportional gain Kptr1. The sum of the lag gain Ktr1 of the lag element 51 and the proportional gain Kptr1 of the proportional element 52 is 1.

The adjuster 5 outputs, as the first reactive current command value Qref1 [pu], a value obtained by adding a value obtained by subjecting the initial reactive current command value Qref0 to a first-order lag processing with the lag element 51 to a value obtained by subjecting the initial reactive current command value Qref0 to a proportional processing with the proportional element 52.

[Maximum Value Setter]

The maximum value setter 6 is configured to set a first maximum value Qrefmax1 [pu] of the reactive current command value Qref according to the magnitude of the active current command value Pref.

The first maximum value Qrefmax1 is set in order to hold down a total current inputted to the power converter 103 to the rated input current value or less while prioritizing consumption of the active power corresponding to the active current command value Pref in the power converter 103.

Specifically, the maximum value setter 6 determines the first maximum value Qrefmax1 using the following formula (1):

$$Qrefmax1=(1-Pref^2)^{1/2} \quad (1)$$

[Restrictor]

The restrictor 7 is configured to have the first reactive current command value Qref1 inputted thereto and to output a second reactive current command value Qref2 [pu].

The restrictor 7 is a minimum value selection circuit LVG to output, as a new reactive current command value (i.e., the second reactive current command value Qref2), the smallest value among the first reactive current command value Qref1 inputted from the adjuster 5, the first maximum value Qrefmax1 inputted from the maximum value setter 6, and a second maximum value Qrefmax2 [pu] set in advance.

The second maximum value Qrefmax2 is a limiter of the reactive current command value Qref. If the reactive current command value Qref need not be limited, the second maximum value Qrefmax2 is set to 1.

[Reactive Processor]

The reactive processor 8 is configured to output, as the reactive current command value Qref, a value obtained by multiplying the second reactive current command value Qref2 by a reactive current command value invalidation signal Qrefoff [pu].

In a case where the power converter 103 is in a regenerative operation, in a case where the vehicle is in a section where voltage drop compensation can be performed by facilities on the ground, or in some other cases, the reactive current command value invalidation signal Qrefoff is set to zero. In a case where voltage drop compensation by the power conversion controller 1 is necessary, the reactive current command value invalidation signal Qrefoff is set to 1.

The reactive current command value Qref outputted from the reactive processor 8 is inputted to the PWM circuit 107 together with the active current command value Pref outputted from the command value generator 2.

1-2. Effects

The embodiment described above in detail produces effects below.

(1a) Since the reactive current command value is set based on the power factor to thereby impose no restriction on setting of the active power, the running performance of the vehicles is maintained. In addition, since the reactive current command value is calculated using the power factor set according to the range of the detection value of the overhead line voltage, variation in the reactive power among the power converters 103 is inhibited.

Furthermore, since the power factor is set smaller when the detection value is below the reference range and the power factor is set larger when the detection value is beyond the reference range, the voltage of the feeding circuit during high load at the feeding substation can be stabilized, and also overvoltage of the feeding circuit during low load at the feeding substation can be inhibited.

(1b) The adjuster 5 makes it possible to facilitate stabilization of the voltage of the feeding circuit.

(1c) The maximum value setter 6 and the restrictor 7 make it possible to prioritize consumption of the active power in the power converter 103. Thus, running of the vehicles can be stabilized.

(1d) The calculation of the voltage difference using the first-order lag control in the preprocessor 31 and the calculation of the first adjustment value and the second adjustment value using the proportional control in the postprocessor 32 enable accurate setting of the power factor corresponding to the detection value of the overhead line voltage.

(1e) Since the limit control is performed in each of the preprocessor 31 and the postprocessor 32 to thereby inhibit the power factor from being too large or too small, stabilization of the voltage of the feeding circuit can be facilitated.

2. Other Embodiments

Although the embodiment of the present disclosure has been described so far, the present disclosure is not limited to the above-described embodiment and can take various forms.

(2a) The power conversion controller 1 of the above-described embodiment does not necessarily have to comprise the maximum value setter 6. For example, in the power conversion controller 1 shown in FIG. 3, the restrictor 7 outputs a smaller one of the first reactive current command value Qref1 and the second maximum value Qrefmax2 as the second reactive current command value Qref2.

Figure 3:
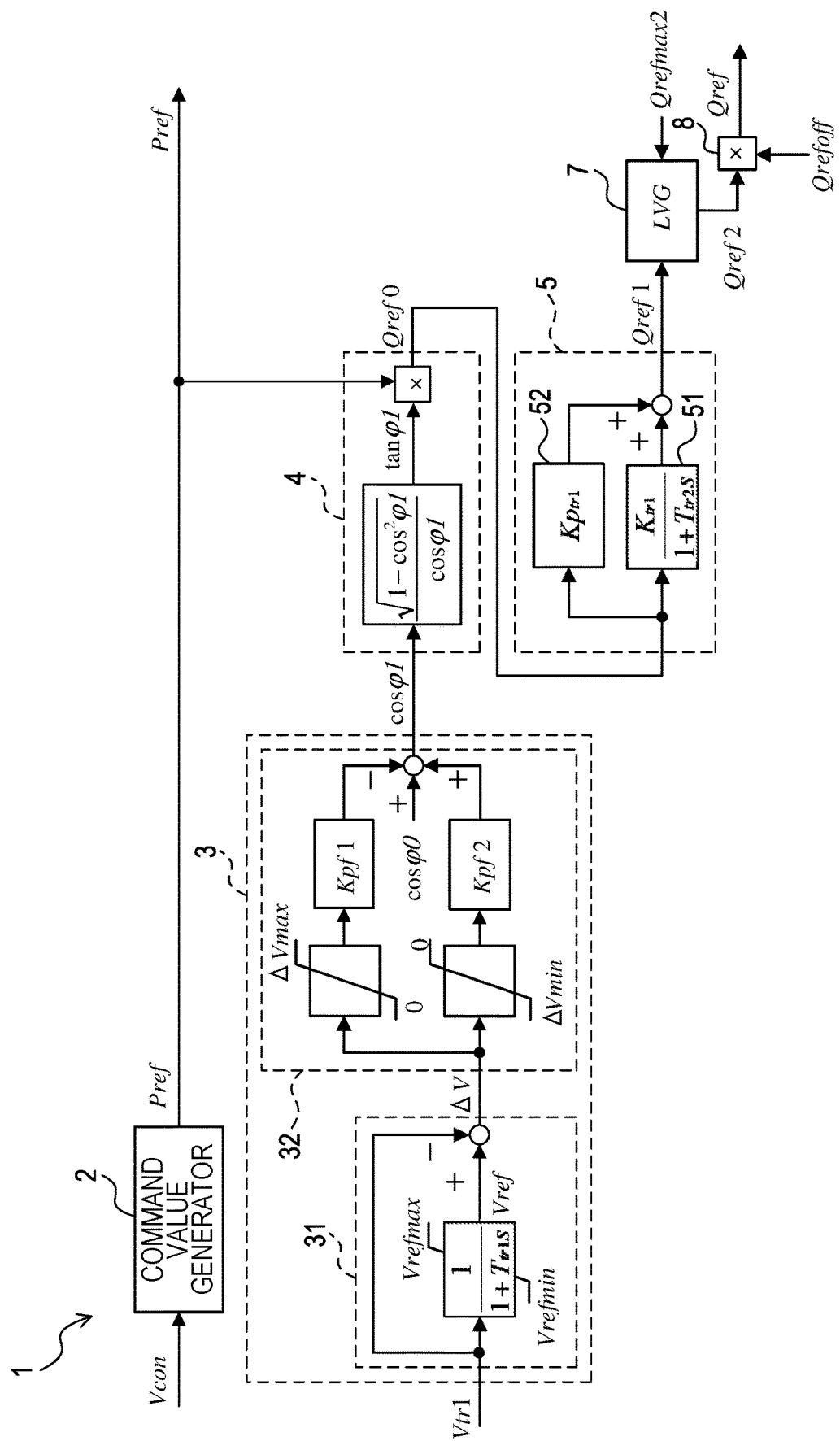
FIG. 3 is a block diagram schematically showing a configuration of a power conversion controller in an embodiment different from that in FIG. 2.

In a case where consumption of the active power in the power converter 103 is not restricted by setting the second maximum value Qrefmax2 properly, a calculation load in the power conversion controller 1 can be reduced by omitting the maximum value setter 6 as shown in FIG. 3.

(2b) In the power conversion controller 1 of the above-described embodiment, the power factor setter 3 is not limited to the above-described circuit or configuration as long as the magnitude of the power factor can be adjusted based on the magnitude of the detection value of the overhead line voltage.

(2c) A function performed by a single element in the above-described embodiments may be performed by a plurality of elements, or a function performed by a plurality of elements may be performed by a single element. A part of a configuration in the above-described embodiments may be omitted. At least a part of a configuration in one of the above-described embodiments may be added to, or may replace, a configuration in another one of the above-described embodiments. Any form included in the technical idea defined by the language of the appended claims is an embodiment of the present disclosure.

3. Examples

An explanation will be given below of the details of examples of analyzation performed to confirm the effects of the present disclosure and evaluation thereof.

Comparative Example

Figure 4A:
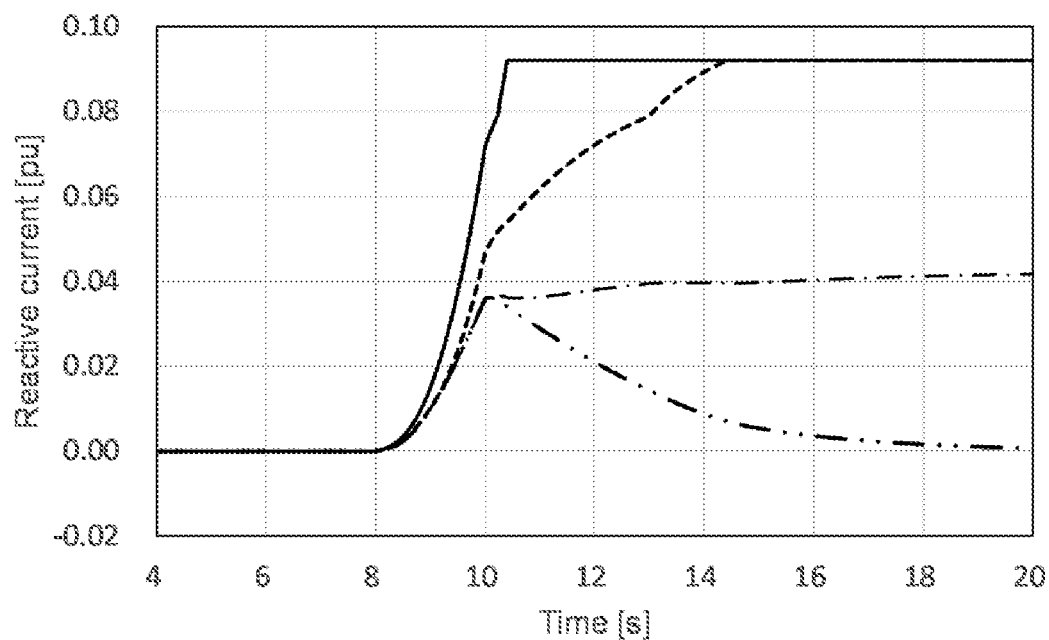
FIG. 4A is a graph showing one example of a reactive current command value outputted by a conventional power conversion controller.

FIG. 4A shows one example of a change, with passage of time, of a reactive current command value outputted from a power conversion controller disclosed in Japanese Unexamined Patent Application Publication No. 2017-188990.

In FIG. 4A, the solid line represents a case where the detection value of the overhead line voltage in a main transformer is −3% of the true value, the broken line represents a case where the detection value of the overhead line voltage is −1.5% of the true value, the dot-dash line represents a case where the detection value of the overhead line voltage is equal to the true value, and the dot-dot-dash line represents a case where the detection value of the overhead line voltage is +2% of the true value.

As shown in FIG. 4A, variation in the detection values of the overhead line voltage causes imbalance of the reactive current command values. Moreover, in the cases where the detection values are −3% and −1.5% of the true value, the reactive current command values reach the maximum value.

EXAMPLE

Figure 4B:
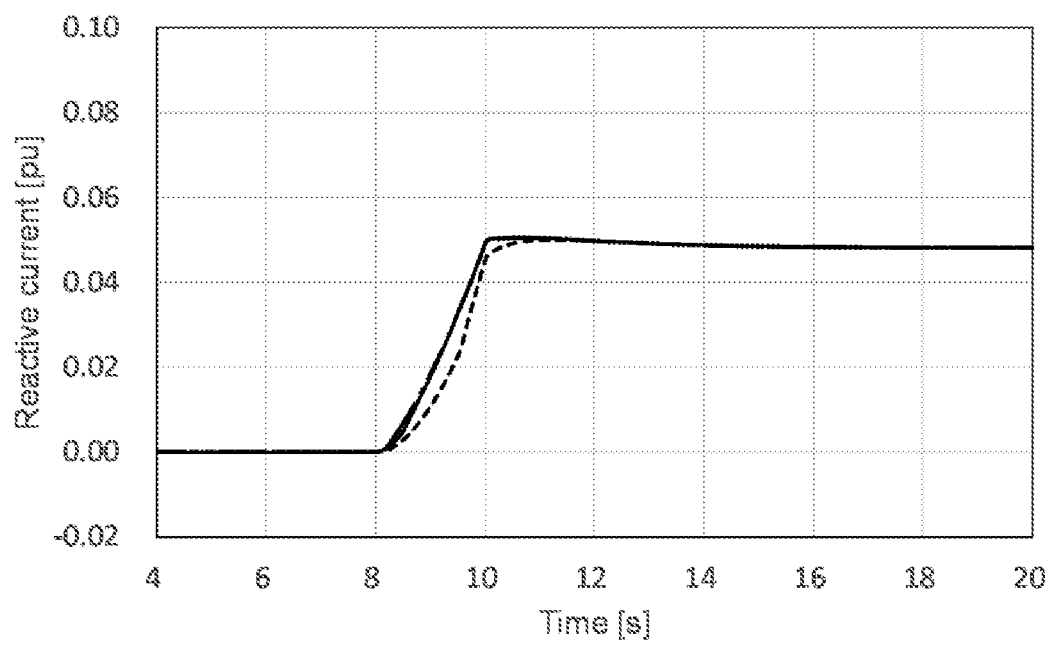
FIG. 4B is a graph showing one example of a reactive current command value outputted by the power conversion controller in FIG. 2.

FIG. 4B shows one example of a change, with passage of time, of a reactive current command value outputted from the power conversion controller 1 shown in FIG. 2.

FIG. 4B shows a graph representing the same four cases as in FIG. 4A. In FIG. 4B, the reactive current command values in the four cases are balanced. That is, imbalance of the reactive current command values due to variation in the detection values of the overhead line voltage is inhibited.

What is claimed is:

1. A power conversion controller that controls a power converter configured to convert an AC power inputted from an overhead line and to consume an active power and a reactive power, the power conversion controller comprising:
a power factor setter configured to set a power factor based on a detection value of an overhead line voltage; and
a calculator configured to calculate a reactive current command value for causing the power converter to consume the reactive power by multiplying an active current command value for causing the power converter to consume the active power by a tangent of a power factor angle of the power factor,
the power factor setter being configured to:
if the detection value is within a reference range set in advance, to set a reference value set in advance as the power factor;
if the detection value is below the reference range, to set a value smaller than the reference value as the power factor; and
if the detection value is beyond the reference range, to set a value larger than the reference value as the power factor,
wherein the power factor setter comprises:
a preprocessor configured to calculate a voltage difference by subtracting the detection value from a voltage command value obtained by a first-order lag control of the detection value; and
a postprocessor configured:
if the voltage difference is zero, to set the reference value as the power factor:
if the voltage difference is positive, to set, as the power factor, a value obtained by subtracting a first adjustment value proportional to an absolute value of the voltage difference from the reference value; and
if the voltage difference is negative, to set, as the power factor, a value obtained by adding a second adjustment value proportional to an absolute value of the voltage difference to the reference value.

2. The power conversion controller according to claim 1, further comprising:
an adjuster including a lag element configured to delay the reactive current command value calculated by the calculator.

3. The power conversion controller according to claim 1, further comprising:
a maximum value setter configured to set a first maximum value according to a magnitude of the active current command value; and
a restrictor configured to have the reactive current command value inputted thereto and to output, as a new reactive current command value, a smallest value among the reactive current command value inputted thereto, the first maximum value, and a second maximum value set in advance.

4. The power conversion controller according to claim 1, wherein the preprocessor is configured:
if the voltage command value is larger than a maximum command value set in advance, to calculate the voltage difference using the maximum command value as the voltage command value; and
if the voltage command value is smaller than a minimum command value set in advance, to calculate the voltage difference using the minimum command value as the voltage command value, and
wherein the postprocessor is configured:
if the voltage difference is positive, to set, as the first adjustment value, a value obtained by multiplying a smaller one of the voltage difference and a maximum voltage difference set in advance by a first coefficient; and
if the voltage difference is negative, to set, as the second adjustment value, a value obtained by multiplying a larger one of the voltage difference and a minimum voltage difference set in advance by a second coefficient.

* * * * *